United States Patent [19]

Retschnig et al.

[11] Patent Number: 5,106,608

[45] Date of Patent: Apr. 21, 1992

[54] MAGNESIUM OXIDE IN FINE POWDER FORM AND ITS USE

[75] Inventors: Alexander Retschnig; Roland Heindl, both of Leoben, Austria

[73] Assignee: Veitscher Magnesitwerke-Actien-Gesellschaft, Vienna, Austria

[21] Appl. No.: 490,572

[22] PCT Filed: Aug. 3, 1989

[86] PCT No.: PCT/AT89/00069

§ 371 Date: Apr. 5, 1990

§ 102(e) Date: Apr. 5, 1990

[87] PCT Pub. No.: WO90/01460

PCT Pub. Date: Feb. 22, 1990

[30] Foreign Application Priority Data

Aug. 10, 1988 [AT] Austria ............................ 2006/88

[51] Int. Cl.$^5$ ............................................. C01F 11/02
[52] U.S. Cl. ................................. 423/635; 423/274; 423/155

[58] Field of Search ............... 423/635, 636, 637, 638, 423/274, 583

[56] References Cited

U.S. PATENT DOCUMENTS 4,298,379 11/1981 Zambrano ........................... 423/635

FOREIGN PATENT DOCUMENTS 7116033 5/1972 Netherlands ........................ 423/274

Primary Examiner—Theodore Morris
Assistant Examiner—Edward Squillante
Attorney, Agent, or Firm—Collard, Roe & Galgano

[57] ABSTRACT

A magnesium oxide in fine powder form, which can be used to manufacture high-density ceramics, has an MgO content greater than 95 wt. %, preferably greater than 98 wt. %, a particle size less than 15 μm, and a BET specific surface area less than 20 m$^2$/g. The statistical mean of the particle shape factor of the primary particles lies between 1 and 1.5. The particles are coated with a hydrophobic, surface-active substance.

8 Claims, No Drawings

MAGNESIUM OXIDE IN FINE POWDER FORM AND ITS USE

The subject of this invention is a pulverulent magnesium oxide having an MgO content greater than 95 wt. %, preferably greater than 98 wt. %, a particle size less than 15 μm and a BET specific surface area less than 20 m²/g as determined from the nitrogen adsorption isotherm.

For attaining high-density ceramics, e.g. in the manufacture of refractory products, it is desirable to fill up the hollow space between the grains of the matrix with very small particles, i.e. with a micro powder. A suitable material, especially as far as refractoriness is concerned, is a micro powder based on high purity magnesium oxide.

It is the object of the invention to provide a magnesium oxide micro powder which can suitably be used to fill up the hollow space in a ceramic matrix and to manufacture ceramics of high density, while the use of such powder shall not be limited to these applications.

According to the invention, the statistical mean of the particle shape factor of the primary particles of a magnesium oxide micro powder of this kind lies between 1 and 1.5 and the particles are coated with a hydrophobic substance.

The particle shape factor K is defined by the expression $$K = \frac{U^2}{4\pi F}$$

where U is the particle circumference and F is the particle surface area, both related to the elevation of such particle as it appears under the microscope. "Primary particles" are the dispersed, non-agglomerated particles. For perfectly spherical particles, the particle shape factor K, a dimension-less figure, equals 1. It is the higher the more the shape of the particle differs from the spherical shape. Thus, a statistical mean in the distribution curve of the particle shape factor in the range between 1 and 1.5 defines primary particles of approximately spherical shape.

Substances which according to the invention may suitably be used for coating the magnesium oxide particles are surface-active materials, in particular unsaturated or saturated fatty acids or derivatives thereof, organo-metallic compounds—such as silicanes, titanates, zirconium aluminates, metal soaps—or silicones or organic polymers. These substances impart to the magnesium oxide powder hydrophobic properties.

These substances reduce the internal friction in the magnesium oxide powder, and the particles—when mixed with the binding agent applied—are given a high degree of mobility; as a result, high densification of the ceramic can be attained during the shaping process.

In general, the magnesium oxide according to the invention contains between 0.1 and 10 wt. % of coating substance.

This coating increases the degree of dispersion in the magnesium oxide micro powder, i.e. apart from individual Primary particles, the micro powder according to the invention contains only relatively small agglomerations of primary particles. Accordingly, the powder has a particle size less than 15 μm, preferably between 0.2 and 15 μm. The size of the primary particles is preferably in the range of 0.2 to 2 μm.

The specific surface area of the micro powder, which can be determined from the nitrogen adsorption isotherm according to BET, should not be too large. For the magnesium oxide according to the invention it is in the range of 2 to 7 m²/g.

A magnesium oxide powder especially suited for the purposes of the invention may be prepared by pyrohydrolysis from a magnesium chloride solution, and a spray roaster may be applied for attaining thermal decomposition. The powder produced in this process is then coated with a substance which imparts to it hydrophobic properties.

The following examples illustrate some of the benefits attainable with the invention.

EXAMPLE 1

A magnesium oxide powder A was prepared from a purified magnesium chloride solution in a spray roasting process. A part of the matertial produced was mixed for some time (6 hours) with a metal soap; the product resulting from this was the coated magnesium oxide powder B. The properties of the materials A and B are compared as follows in Table 1:

TABLE 1

|  | MgO powder A (untreated) | MgO powder B (coated) |
|---|---|---|
| Chemical analysis | wt. % | wt. % |
| MgO | 97.3 | 94.4 |
| $SiO_2$ | 0.03 | 0.03 |
| CaO | 0.55 | 0.53 |
| $Fe_2O_3$ | 0.06 | 0.06 |
| $Cr_2O_3$ | 0.04 | 0.04 |
| $Cl^-$ | 1.80 | 1.75 |
| $SO_4^-$ | 0.20 | 0.19 |
| metal soap |  | 3.0 |
| Specific surface area | 5.2 m²/g | 5.2 m²/g |
| Part. size analysis |  |  |
| $d_{30}$ | 1.2 μm | 1.2 μm |
| $d_{50}$ | 2.0 μm | 1.8 μm |
| $d_{70}$ | 4.2 μm | 3.8 μm |
| Degree of hydration | 60% | 15% |
| Particle shape factor of primary particles | 1.04–1.55 | 1.04–1.55 |
| statistical mean | 1.15 | 1.15 |

In the particle size analysis, the values d30, d50, and d70 indicate those particle sizes where 30, 50 or 70 percent of particles are smaller than the values given.

The degree of hydration was determined in samples which had been kept in a climatic test cabinet for 48 hours at a temperature of 40° C. and an atmosphere of 95 percent relative humidity. The degree of hydration was established from the gain in weight after the samples had picked up humidity, a 100 percent degree of hydration being equivalent to the complete reaction of MgO to Mg(OH)2.

EXAMPLE 2

Batches or brick manufacturing were prepared from 10 wt. % untreated magnesium oxide powder A or 10 wt. % coated magnesium oxide powder B, respectively, with 90 wt. % sinter magnesia having a grain size of less than 3 mm, made from low iron natural magnesite. The batches were pressed to bricks which were subsequently fired at a temperature of 1850° C. The bricks rendered the following test values shown in Table 2:

TABLE 2

|  | with untreated MgO powder A | with coated MgO powder B |
|---|---|---|
| Bulk density | 2.95 g/cm$^3$ | 3.08 g/cm$^3$ |
| Apparent porosity | 17.4 vol. % | 13.9 vol. % |
| Crushing strength at ambient temperature | 48.1 N/mm$^2$ | 74.3 N/mm$^2$ |

EXAMPLE 3

Shaped bodies were made from 100 wt. % magnesium oxide powder A and 100 wt. % magnesium oxide powder B, respectively. The bodies were subsequently fired at a temperature of 1600° C. The following test values were found as shown in Table 3:

TABLE 3

|  | with untreated MgO powder A | with coated MgO powder B |
|---|---|---|
| Bulk density | 3.22 g/cm$^3$ | 3.45 g/cm$^3$ |
| Apparent porosity | 8.5 vol. % | 2.3 vol. % |
| Crushing strength at ambient temperature | 95 N/mm$^2$ | 134 N/mm$^2$ |

We claim:

1. Pulverulent magnesium oxide having an MgO content of greater than 95 wt. %, a particle size less than 15 μm and a BET specific surface area of 2 and less than 7 m$^2$/g, as determined from the nitrogen adsorption isotherm, the statistical mean of the particle shape factor of the primary particles being between 1 and 1.5 and the particles being of approximately spherical shape and being coated with a hydrophobic substance.

2. Magnesium oxide according to claim 1, wherein the particle size is between 0.2 and 15 μm.

3. Magnesium oxide according to claim 2, wherein the size of the primary particles is between 0.2 and 2 μm.

4. Magnesium oxide according to claim 1, wherein the hydrophobic substance consists of a surface-active material.

5. Magnesium oxide according to claim 1, containing 0.1 to 10 wt. % of the hydrophobic substance.

6. A high-density ceramic material containing the magnesium oxide of claim 1.

7. Magnesium oxide according to claim 1, having a MgO content of greater than 98 wt. %.

8. Magnesium oxide according to claim 4, wherein the surface-active material comprises a fatty acid, a derivative thereof, an organo-metallic compound, a silicone or an organic polymer.

* * * * *